REFERENCE SEARCH ROOM
5272G

Nov. 26, 1957 P. H. PETERS, JR., ET AL 2,814,777

NOISE GENERATING SYSTEM

Filed Nov. 23, 1953

INVENTORS,
PHILIP H. PETERS JR.
DONALD A. WILBUR.
BY Harry M. Saragovitz
ATTORNEY.

2814777
OR IN 332/1

2,814,777

NOISE GENERATING SYSTEM

Philip H. Peters, Jr., Schenectady, and Donald A. Wilbur, Albany, N. Y., assignors to the United States of America as represented by the Secretary of the Army Application November 23, 1953, Serial No. 393,970

6 Claims. (Cl. 332—1)

This invention relates to noise generators, and more particularly to a novel system for introducing random amplitude fluctuations into a carrier wave which is frequency modulated by noise.

Noise frequency-modulated signals are useful for jamming frequency modulated receivers. It is often desirable to alter these signals at the transmitter so that the same equipment can be used for jamming amplitude modulated receivers. In other equipments where special operating features are desired, it is easier to produce a noise frequency-modulated signal than a noise amplitude-modulated signal. One example of such a circuit is a voltage tuned magnetron modulated by noise. Another is a single noise generating magnetron which is either insufficiently loaded or operating at too high an output level to produce amplitude modulated noise, but which does directly produce noise frequency-modulated signals.

In general, a noise frequency-modulated signal will interfere with the operation of an amplitude modulated receiver only if the noise bandwidth is larger than the bandwidth of the receiver or if the noise frequency-modulated signal is tuned to a slope of the receiver response. In both cases the receiver must provide a discriminating action. It is therefore desirable to alter such a signal by introducing therein random amplitude variations if it is to be used for jamming an amplitude modulated system.

It has been found that a noise frequency-modulated signal may be altered in the following general ways to produce fluctuations of its amplitude so that it affects an amplitude modulated receiver without the receiver having to provide any discriminating action:

*a.* Altering the relative amplitudes of the components of the noise frequency-modulated signal.

*b.* Altering the relative phases of the components of the noise frequency-modulated signal.

*c.* Storing or delaying some of the energy of the noise frequency-modulated signal and mixing it with the noise frequency-modulated signal being produced at a later time.

*d.* A combination of two or more of the above methods.

In all of the above methods the relations between the components of the noise frequency-modulated signal are altered from those necessary for a constant amplitude, varying-frequency and thus fluctuations of amplitude of the resultant signal are introduced.

In general, it is desirable to alter the noise frequency-modulated signal in such a manner that energy is not reflected to the generator. For example, in the case of the directly generated noise frequency-modulated signal from a magnetron, this is particularly desirable since such reflection results in a lessening of the loading at particular frequencies and thus introduces a tendency for the magnetron to produce a single coherent signal.

It is an object of this invention to provide a new and improved circuit for introducing amplitude modulation components in a noise frequency-modulated signal.

It is a further object of this invention to provide a circuit of the above type in which energy reflected to the generator is insufficient to produce coherence in the generator output signal.

In accordance with one embodiment of the invention, there is provided a source of noise frequency-modulated signals, a radiator, a waveguide section joining the source and the radiator and a plurality of resonators tuned to the mean frequency of the noise signal, coupled to the wave guide at odd quarter wavelength intervals.

In accordance with another embodiment of the invention, there is provided a hybrid waveguide junction having at least four arms, a noise frequency-modulated signal generator feeding energy to one of said arms, a load receiving the output of another of said arms and cavity resonators tuned to the mean frequency of the noise frequency-modulated signal at the ends of the remaining two arms, respectively.

The features of the invention which are believed to be novel are set forth with particularity in the appended claims. The invention itself, however, both as to its organization and method of operation, together with further objects and advantages thereof, may best be understood by reference to the following description taken in conjunction with the accompanying drawing in which:

Figure 1:
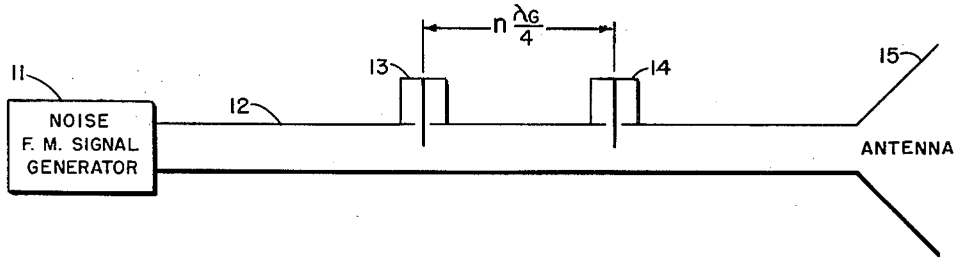
Fig. 1 is a schematic diagram of an embodiment of the invention utilizing a wave guide and a plurality of resonators.

Referring now to Fig. 1, there is shown a noise frequency-modulated signal generator 11, an antenna 15, and a section of wave guide 12 joining the generator with the antenna. Spaced at odd quarter wavelength intervals along the wave guide are resonators 13 and 14 which are tuned to the mean frequency of the frequency-modulated signal. Although only two resonators are shown, it is understood that any number of resonators may be employed.

In operation, resonators 13 and 14 absorb and reradiate the energy as the signal passes. This action is frequency dependent in phase and amplitude due to the resonant character of structures 13 and 14. For the same reason there is storage and delay in the reradiation of some of the energy extracted from the noise signal. There is therefore an alteration of the relative phases and amplitudes of the signal components and a mixing of a passing and delayed portion of the signal. All these actions produce fluctuations of the amplitude of the resultant signal.

Resonator 14 is an odd number of quarter wavelengths further from the generator than resonator 13. Therefore, the driving phase and the phase of radiation and reflection from resonator 14 will lag that from resonator 13 by an odd integer times 90 degrees. The signals from these two points which are directed towards the generator will have their phase difference doubled before they combine and will therefore cancel since the resultant phase difference becomes equal to an odd integer times 180 degrees. The signals from these two points which are directed towards the antenna will combine in phase however and will thus be transmitted to the load. The system, therefore, is directive, cancelling out reflection to the generator and sending energy in the direction of the antenna.

Figure 2:
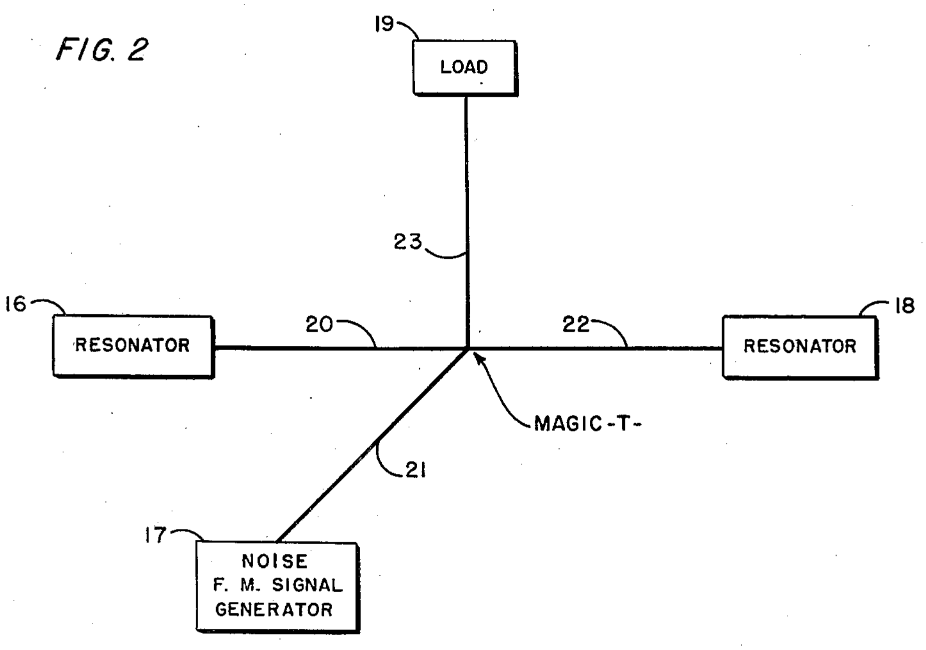
Fig. 2 is a schematic diagram of another embodiment of the invention using a magic-T waveguide junction.

In Fig. 2 there is shown a magic-T type of hybrid junction having arms 20, 21, 22 and 23. The theory of such devices is well known in the art and is discussed in detail in chapter 8 of volume 14 of the Radiation Laboratory Series titled "Microwave Duplexers." Noise frequency-modulated signal generator 17 feeds energy into arm 21 of the T, and load 19, which may be an antenna or any other radio frequency load, receives energy from arm 23 of the T. Resonators 16 and 18 are tuned to the mean frequency of the noise frequency-modulated signal. Arm 22 differs in length from arm 20 by an odd number of quarter wavelengths.

In operation, energy entering the magic-T junction from arm 21 will divide into branches 20 and 22 but not into branch 23, since no electrical field is produced across branch 23. The energy is transmitted to the impedances terminating arms 20 and 22 where reflections take place and the energy is reflected back to the junction of the T. Since the total path for the direct and reflected waves in branch 22 differs by an odd number of wave guide half wavelengths from that in branch 20, the reflected energy at the means frequency will differ in phase by 180 degrees at the junction of the T. This is the condition for complete transmission into branch 23 and no transmission into branch 21.

The above action takes place as long as the impedance of the termination of arm 20 is equal to the impedance of the termination of arm 22. However, if these impedances are of such a nature that phase or amplitude changes are introduced into the component signals during reflection that alter the relative relations of the components from those necessary for frequency modulation, then changes in amplitude will be produced in the signal being reflected and transmitted into branch 23 and thence to the load. Also, if some energy is stored and reradiated at a later time, from the impedances terminating arms 20 and 22, mixing of the signals will occur that will also result in the production of amplitude changes. Resonators 16 and 18, as explained in connection with the resonators of Fig. 1, do introduce phase and amplitude change and do store and reradiate at a later time a portion of the energy supplied thereto and therefore do provide a noise frequency-modulated signal having random noise amplitude fluctuations in arm 23 going to load 19.

In a circuit actually built to demonstrate the operation of the device shown in Fig. 2, a noise frequency-modulated signal of 110 watts, generated directly by a magnetron, was converted into 85 watts of signal having approximately 80% amplitude modulation.

Although Fig. 2 shows a system employing a magic-T waveguide junction, it should be understood that ring and other types of hybrid junctions may be used to produce the same effect.

While there has been described what is at present considered the prefered embodiment of the invention, it will be obvious to those skilled in the art that various changes and modifications may be made therein without departing from the invention and it is aimed in the appended claims to cover all such changes and modifications within the true spirit and scope of the invention.

What is claimed is:

1. In combination, a source of carrier wave energy, frequency modulated by noise currents, utilization means, transmission line means coupling said source to said utilization means, and means for converting said frequency modulation to an amplitude modulation of said carrier wave comprising a plurality of resonators tuned to the mean frequency of said carrier wave, said resonators being coupled to said transmission line means at positions which are effectively located to provide a spacing of a quarter wave length between resonators whereby said amplitude modulated wave energy cancels in the direction of said source and adds in the direction of said utilization means.

2. In combination, a source of carrier wave energy frequency modulated by noise currents, antenna means, a transmission line coupling said source to said antenna means, and means for converting said frequency modulation to an amplitude modulation of said carrier wave comprising a plurality of cavity resonators tuned to the mean frequency of said wave coupled to said line, said resonators being spaced from each other along said line at odd quarter wavelength intervals at the mean frequency of said wave.

3. The combination as set forth in claim 2, in which line is a waveguide.

4. In combination, a hybrid waveguide junction having four arms comprising an input and an output arm and two conjugate arms, a source supplying carrier wave energy frequency modulated by noise currents, to said input arm, a load terminating said output arm, and a pair of resonators tuned to the mean frequency of said wave terminating said conjugate arms of said junction, respectively, one of said conjugate arms differing in length from the other arm by an odd number of quarter wavelengths at the mean frequency of said wave whereby said amplitude modulated wave energy cancels in the direction to said source and adds in the direction to said load.

5. The combination set forth in claim 4, in which said junction is a magic-T junction and said source and load are coupled to opposite arms of said T.

6. An arrangement for converting wave energy modulated in frequency by noise to wave energy modulated in amplitude by noise comprising, a source of said frequency modulated wave energy, a load circuit, means for translating said energy in a predetermined path from said source to said load, a pair of similar cavity resonators coupled to said path and adapted to resonate and return said wave energy to said path in amplitude modulated form, said resonators having locations chosen to combine said amplitude modulation energy flowing in the direction of said load and to neutralize said energy flowing back to said source.

References Cited in the file of this patent

UNITED STATES PATENTS

| | | |
|---|---|---|
| 2,498,548 | Howard | Feb. 21, 1950 |
| 2,588,226 | Fox | Mar. 4, 1952 |
| 2,660,666 | Duckett et al. | Nov. 24, 1953 |